United States Patent [19]

Henle

[11] Patent Number: 4,731,955

[45] Date of Patent: Mar. 22, 1988

[54] APPARATUS FOR RELEASABLY COUPLING GRINDING TOOLS TO ROTARY SPINDLES

[75] Inventor: Karl Henle, Reinbek, Fed. Rep. of Germany

[73] Assignee: Körber AG, Hamburg, Fed. Rep. of Germany

[21] Appl. No.: 891,539

[22] Filed: Jul. 31, 1986

[30] Foreign Application Priority Data

Aug. 24, 1985 [DE] Fed. Rep. of Germany ....... 3530351

[51] Int. Cl.[4] .............................................. B24B 41/04
[52] U.S. Cl. ...................................................... 51/168
[58] Field of Search ............................. 29/568; 51/168

[56] References Cited

U.S. PATENT DOCUMENTS

| | | | |
|---|---|---|---|
| 791,159 | 5/1905 | Norton | 51/168 |
| 1,719,941 | 7/1929 | Mogford | 51/168 |
| 2,397,849 | 4/1946 | Engeln | 51/168 |
| 2,398,664 | 4/1946 | Paul | 51/168 |
| 3,483,902 | 12/1969 | Schiffers et al. | 51/168 |
| 3,818,645 | 6/1974 | McEwan | 51/168 |
| 4,257,197 | 3/1981 | Lombard | 51/168 |
| 4,582,461 | 4/1986 | Ziegelmeyer | 51/168 |

FOREIGN PATENT DOCUMENTS 3419397 12/1984 Fed. Rep. of Germany .
3403361 6/1985 Fed. Rep. of Germany .

*Primary Examiner*—Harold D. Whitehead
*Attorney, Agent, or Firm*—Peter K. Kontler

[57] ABSTRACT

Apparatus for coupling a rotary grinding tool to a rotary spindle has a long centering cone at the front end of the spindle for entry into a complementary conical hole in the main portion of a hub which separably holds the tool. The spindle transmits torque to the hub by means of two male torque transmitting elements provided on an axial extension of the hub and extending into complementary recesses provided on a ring-shaped member at the smaller-diameter end of the cone. The tool is held in a predetermined axial position by an end face of the extension which abuts an end face of the cone. A package of springs is installed in the cone to normally bias the extension of the hub axially of and away from the spindle so as to facilitate separation of the tool from the spindle by means of an automatic tool changer. The spring surrounds the shank of a screw or bolt which separably secures the extension of the hub to the cone of the spindle.

12 Claims, 2 Drawing Figures

APPARATUS FOR RELEASABLY COUPLING GRINDING TOOLS TO ROTARY SPINDLES

BACKGROUND OF THE INVENTION

The invention relates to an apparatus for releasably coupling rotary material removing tools to rotary driving elements, particularly for separably securing grinding wheels or analogous tools to rotary spindles in grinding machines. More particularly, the invention relates to improvements in coupling apparatus of the type wherein the rotary driving element (hereinafter called spindle for short) includes or carries an elongated cone which is receivable in a complementary hole or bore of a flange or hub which is preferably separably connected to and carries the material removing tool. The apparatus of the present invention can be utilized to couple a variety of rotary material removing tools, especially grinding wheels, dressing wheels, profiling rolls and the like.

It is customary to provide the spindle of a grinding machine with an elongated cone which can support and transmit torque to a material removing tool (hereinafter called grinding wheel or tool for short). As a rule, the cone is rather long so as to ensure that its external surface is held in self-locking engagement with the surface surrounding the conical hole or bore of the hub. A drawback of such conventional coupling apparatus is that the axial position of the hub relative to the cone cannot be selected and maintained with a desired degree of accuracy. Furthermore, the self-locking action between the cone and the hub for a grinding wheel or the like exhibits the drawback that the apparatus cannot be actuated by automatic grinding wheel changers.

Attempts to overcome the drawbacks of such conventional apparatus include the utilization of so-called short cones of the type disclosed, for example, in commonly owned German published application No. 34 19 397 and in German Pat. No. 34 03 3661. The utilization of a relatively short cone reduces the likelihood of self-locking and thus simplifies and facilitates the mounting of the hub on as well as separation of the hub from the cone on the spindle. The cone takes up radial stresses, i.e. it serves to center the hub on the spindle. The means for transmitting torque from the spindle to the tool includes end faces at one axial end of the spindle, and such end faces further serve to ensure that the hub is held in a predetermined axial position with reference to the cone. A drawback of coupling apparatus which utilize relatively short cones is that they cannot be used in connection with the mounting of and transmission of torque to relatively large and heavy grinding and like material removing tools.

OBJECTS AND SUMMARY OF THE INVENTION

An object of the invention is to provide a coupling apparatus which employs a relatively long cone but is nevertheless suitable for actuation by automatic tool changing devices.

Another object of the invention is to provide an apparatus which can be utilized to separably secure the hubs of existing grinding and like material removing tools to the relatively long cone of a spindle or a like driving element.

A further object of the invention is to provide an apparatus which is simple, compact and relatively inexpensive and can be actuated by a variety of existing tool changing systems.

Still another object of the invention is to provide an apparatus wherein the hub automatically moves axially of and in a direction away from the cone as soon as the positive locking connection between the hub and the cone is relaxed or terminated.

The improved apparatus is used to releasably couple a material removing tool, particularly a grinding wheel, to a rotary spindle or a like driving element. The apparatus comprises means for centering the tool in the spindle, including a hub which is connectable with the tool or is an integral part of the tool and has a conical hole, and a complementary cone provided on the spindle and extending into the hole; means for locating the tool in a predetermined axial position with reference to the spindle including abutment means provided on the hub and on the cone; and means for transmitting torque from the spindle to the tool including complementary torque transmitting elements which are provided on the cone and on the hub at one axial end of the cone.

The abutment means preferably comprises a first end face at one axial end of the cone and a second end face 4 adjacent to the first end face and provided on the hub. The hub preferably comprises a main portion which is connectable with the tool, an extension, and means for fastening the extension to the main portion. The second end face is preferably provided on the extension of the hub. The hub can further comprise a substantially ring-shaped shim of predetermined thickness which is interposed between the main portion and the extension.

The torque transmitting elements preferably comprise at least one male torque transmitting element on the end face of the extension and at least one complementary female torque transmitting element on the end face of the cone. The positions of the male and female torque transmitting elements can be interchanged.

The apparatus preferably further comprises means for urging the hub axially of and away from the cone. The hub is releasably secured to the cone by a threaded fastener having a shank which is coaxial with the hub and with the cone. The urging means preferably comprises at least one resilient element which serves to bias the hub axially and away from the cone. The resilient element can include at least one annular spring (for example a package of annular dished springs) surrounding the shank. The urging means preferably further comprises an annular plunger which surrounds the shank and abuts the hub. The resilient element reacts against the cone and bears against the plunger. The plunger is preferably reciprocable in an axial passage of the main portion of the hub and bears against the extension under the bias of the resilient element. This renders it possible to move the hub axially of and away from the cone as soon as the threaded fastener which connects the hub to the cone is rotated in a direction to loosen the connection between the hub and the cone.

The main portion of the hub is preferably provided with means (such as one or more facets, one or more threaded bores or the like) for facilitating the application to the main portion of a force which prevents rotation of the main portion relative to the cone during rotation of the fastener in a direction to secure the extension to or to allow for separation of the extension from the main portion of the hub.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE

FIG. 1 is an axial sectional view of a coupling apparatus which embodies one form of the invention and whose parts are shown in positions they assume while coupling the spindle to a grinding wheel; and FIG. 2 is an enlarged fragmentary sectional view as seen in the direction of arrows from the line A—A of FIG. 1.

DESCRIPTION OF THE PREFERRED EMBODIMENTS

Figure 1:
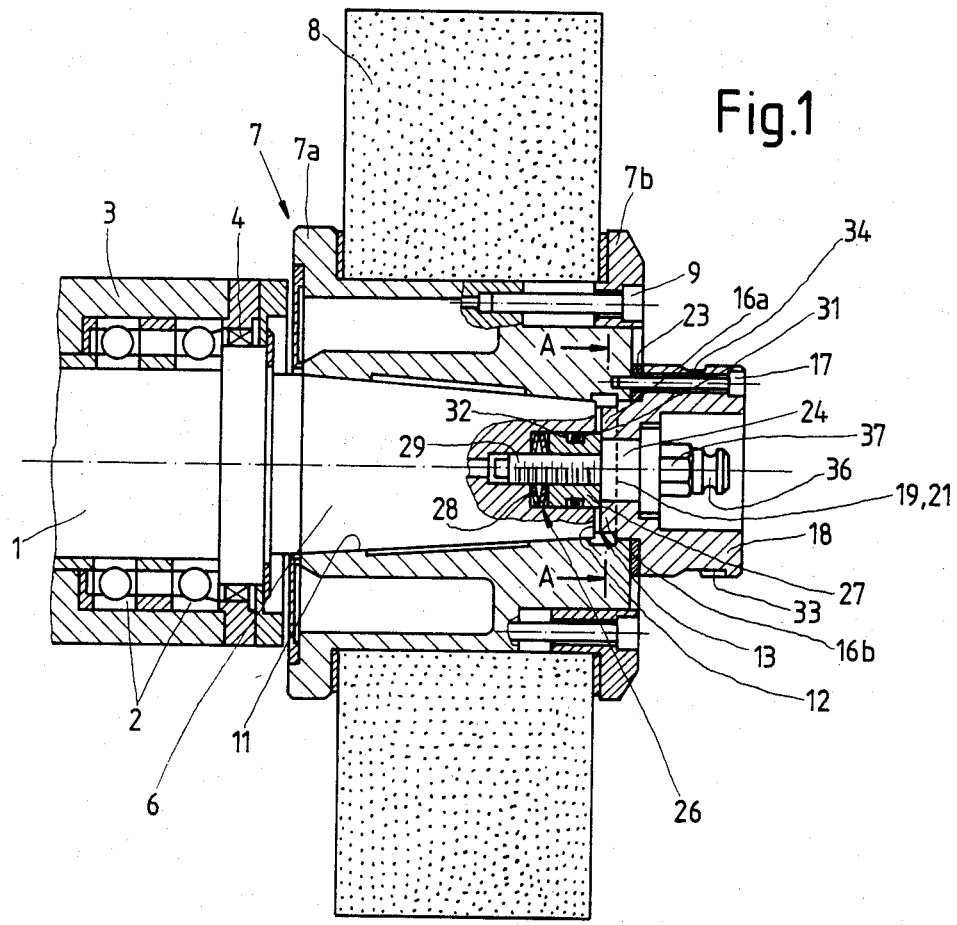
Figure 2:
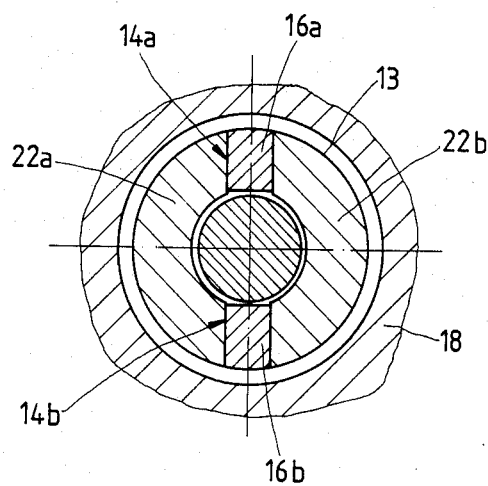

FIGS. 1 and 2 show an apparatus which serves to separably couple a material removing tool 8 (herein shown as a rotary grinding wheel) to a driving element 1 in the form of a rotary spindle which is mounted in a spindle carrier 3 with the interposition of one or more antifriction ball, roller or needle bearings 2. The front end of the spindle carrier 3 is sealed by a ring-shaped sealing element 4.

The means for centering the tool 8 on the spindle 1 comprises an elongated centering cone 6 which is provided at the front axial end of the spindle 3 and is received in a complementary conical hole or bore 11 provided in the main portion of a hub 7 which separably carries the grinding tool 8. The main portion of the hub 7 comprises two coaxial ring-shaped sections 7a and 7b which are separably held together by threaded fasteners 9. The flanges of the sections 7a and 7b are disposed at opposite axial ends of the tool 8. The conical hole 11 is provided in the section 7b. The lengths of the cone 6 and of the hole 11 are preferably selected or can be selected in such a way that the external surface of the cone is in self-locking engagement with the surface surrounding the hole 11. This means that a relatively large force is necessary to separate the hub 7 from the cone 6.

In order to enable an automatic tool changing system to remove the tool 8 from or to attach the tool to the spindle 1, the cone 6 and the surface surrounding the hole 11 merely perform a centering action rather than transmitting torque between the tool and the spindle and/or ensuring that the tool is held in an optimum axial position with reference to the spindle 1.

The means for transmitting torque from the spindle 1 to the tool 8 comprises a ring-shaped member 13 which projects beyond the end face 12 of the cone 6 and has two female torque transmitting elements in the forms of recesses 14a, 14b (FIG. 2) complementary to and receiving male torque transmitting elements 16a, 16b provided on an extension 18 of the hub 7. The extension 18 is coaxially but separably affixed to the section 7b of the main portion of the hub 7 by one or more threaded fasteners in the form of bolts or screws 17.

The means for maintaining the tool 8 in a predetermined axial position with reference to the spindle 1 comprises an end face 19 which is provided on the member 13 of the cone 16 and an adjacent abutting end face 21 at the inner side of the extension 18. The end face 19 includes two arcuate sections provided on two arcuate portions 22a, 22b which form part of the member 13 and alternate with the female torque transmitting elements or recesses 14a, 14b. The end face 21 of the extension 18 has two arcuate sections which alternate with the male torque transmitting elements 16a and 16b. The two sections of the end face 21 are located at the right-hand axial ends of the elements 16a, 16b as seen in FIG. 1. The plane in which the end faces 19, 21 abut when the apparatus is properly assembled is indicated in FIG. 1 by a broken line.

The illustrated coupling apparatus further comprises a ring-shaped shim 23 which is disposed between the main portion 7a, 7b of the hub 7 and the extension 18. The thickness of the shim 23 depends upon the width of the clearance or gap between the extension 18 and the main portion of the hub 7. The width of the gap depends on the manufacturing tolerances, particularly upon the tolerances of machining the cone 6 and the surface surrounding the conical hole 11 in the main portion of the hub 7. The means for releasably securing the extension 18 to the section 7b of the hub 7 comprises a threaded fastener 24 having an externally threaded shank 29 which extends into a tapped axial bore of the cone 6.

The apparatus further comprises means 26 for urging the hub 7 axially of and away from the cone 6 so as to facilitate separation of the tool 8 from the spindle 1 in response to rotation of the fastener 24 in a direction to permit the extension 18 to move axially of and away from the adjacent smaller-diameter end portion of the cone 6. Such tendency of the hub 7 to move axially of and away from the spindle 1 is particularly desirable when the apparatus is to be manipulated by an automatic tool changer. The urging means 26 is installed in an axial passage at the smaller-diameter end of the cone 6 and comprises a resilient element here shown as including a package of annular dished springs 28, and a plunger 27 which is an annulus surrounding the shank 29 and being reciprocable in the aforementioned axial passage of the cone 6. When the fastener 24 is rotated in a direction to permit a movement of the extension 18 axially of and away from the cone 6, the resilient element 28 dissipates energy and pushes the plunger 27 in a direction to the right, as seen in FIG. 1, so that the plunger 27 extends partially beyond the smaller-diameter end of the cone 6 and pushes the entire hub 7 axially of and away from the spindle 1. The means for preventing complete expulsion of the plunger 27 from the passage in the cone 6 comprises a resilient ring 31 which is received in a circumferential groove 32 of the plunger 27 and is in frictional engagement with the surface surrounding the passage of the cone 6. The frictional engagement between the ring 31 and the internal surface of the cone 6 is not sufficient to prevent the springs 28 from dissipating energy and moving the extension 18 axially of and away from the cone 6 in response to a loosening of the connection between the extension 18 and the cone, i.e., in response to rotation of the fastener 24 in a direction to permit a movement of the extension 18 and main portion 7a, 7b of the hub 7 away from the spindle 1. When the fastener 24 is tightened so as to properly hold the tool 8 in a predetermined axial position with reference to the spindle 1, the urging means 26 acts not unlike a resilient washer for the fastener 24 and reduces the likelihood of accidental angular displacement of the fastener relative to the extension 18.

The extension 18 is further provided with means for facilitating the application of a force in order to hold the hub 7 against rotation with the fastener 24 when the fastener is rotated in a direction to secure the hub 7 or to permit disengagement of the hub from the spindle 1. The facilitating means comprises one or more recesses 33 which are provided in the periphery of the extension 18 and can receive a locking bolt or a like element which holds the extension 18 (and hence the entire hub 7) against rotation with the fastener 24 when the latter is engaged by a wrench (not shown) to receive torque in a clockwise or in a counterclockwise direction. To this end, the exposed end portion of the fastener 24 comprises a hexagonal component 37 which can be engaged by the aforementioned wrench.

The extension 18 is further provided with one or more external facets 34 or like configurations which enable the aforementioned automatic tool changer to engage and move the extension (and hence the entire hub 7 and the tool 8) axially of the spindle 1. The exposed end portion of the fastener 24 is provided with a circumferential groove 36 which is designed to receive a portion of the automatic tool changer. This enables the tool changer to simultaneously move the tool 8 and the hub 7 (inclusive of the extension 18) axially of toward and away from the spindle 1.

An important advantage of the improved coupling apparatus is that it enables an automatic tool changer to manipulate the tool 8 regardless of the fact that the spindle 1 is or can be provided with a so-called long cone 6. Long cones are particularly desirable when the spindle 1 is to carry one or more relatively large and heavy grinding or other material removing tools.

The apparatus can be furnished with a full set of shims 23 of different thicknesses so as to make sure that a shim of proper thickness can be selected in order to account for the width of the gap between the main portion of the hub 7 and its extension 18. The dimensions of the gap can be readily ascertained prior to selection of the appropriate shim.

A further important advantage of the improved apparatus is that the urging means 26 facilitates separation of the tool 8 from the spindle 1 which is especially important if the apparatus is to be manipulated by an automatic tool changer.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

I claim:

1. Apparatus for releasably coupling a material removing tool, particularly a grinding wheel, to a rotary spindle, comprising means for centering the tool on the spindle including a hub connectable with the tool and having an elongated conical hole, and a complementary elongated cone provided on the spindle and extending into said hole; means for locating the tool in a predetermined axial position with reference to the spindle, including abutment means provided on said hub and on said cone; and means for transmitting torque from the spindle to the tool including complementary torque transmitting elements provided on said cone and on said hub at one axial end of said cone.

2. The apparatus of claim 1, wherein said abutment means comprises a first end face at one axial end of said cone and a second end face adjacent said first end face and provided on said hub.

3. The apparatus of claim 2, wherein said hub comprises a main portion connectable with the tool, an extension, and means for fastening said extension to said main portion, said second end face being provided on said extension.

4. The apparatus of claim 3, wherein said hub further comprises a ring-shaped shim of predetermined thickness intermediate said main portion and said extension.

5. The apparatus of claim 1, wherein said hub comprises a main portion, an extension and means for fastening said extension to said main portion, said extension having a first end face and said cone having a second end face adjacent said first end face, said torque transmitting elements comprising at least one male torque transmitting element on one of said end faces and at least one complementary female torque transmitting element in the other of said end faces.

6. The apparatus of claim 1, further comprising means for urging said hub axially of and away from said cone.

7. The apparatus of claim 6, further comprising a threaded fastener for releasably securing said hub to said cone, said fastener having a shank which is coaxial with said hub and said cone and said urging means comprising at least one resilient element arranged to bias said hub axially and away from said cone.

8. The apparatus of claim 7, wherein said resilient element includes at least one annular spring surrounding said shank.

9. The apparatus of claim 7, wherein said urging means further comprises an annular plunger surrounding said shank and abutting said hub, said resilient element reacting against said cone and bearing against said plunger.

10. The apparatus of claim 9, wherein said resilient element includes at least one dished spring.

11. The apparatus of claim 9, wherein said hub comprises a main portion arranged to carry the tool, an extension and means for releasably fastening said extension to said main portion, said cone having an axial passage reciprocably receiving said plunger and said plunger abutting said extension under the bias of said resilient element, said extension being arranged to move axially of and away from said cone under the action of said resilient element in response to loosening of said fastening means.

12. The apparatus of claim 1, wherein said hub comprises a main portion arranged to carry the tool, an extension coaxial with said main portion, and a rotary threaded fastener for separably attaching said extension to said main portion, said main portion having means for facilitating the application of a force which prevents rotation of said main portion relative to the cone during rotation of said fastener in a direction to secure said extension to, or to allow for separation of said extension from, said main portion.

* * * * *